United States Patent [19]

Raetz

[11] Patent Number: 4,708,362
[45] Date of Patent: Nov. 24, 1987

[54] STABILIZER DEVICE

[76] Inventor: Warren V. Raetz, 180 Thompson Rd., Grand Junction, Colo. 81503

[21] Appl. No.: 40,728

[22] Filed: Apr. 20, 1987

Related U.S. Application Data

[63] Continuation of Ser. No. 846,610, Mar. 31, 1986.

[51] Int. Cl.$^4$ .............................................. B60S 9/02
[52] U.S. Cl. .................................................. 280/763.1
[58] Field of Search ................. 280/433, 763.1, 764.1, 280/765.1, 766.1; 248/354.1, 168

[56] References Cited

U.S. PATENT DOCUMENTS

| | | | |
|---|---|---|---|
| 2,924,463 | 2/1960 | Livermont | 280/763.1 |
| 3,387,821 | 6/1968 | Saddler | 254/419 |
| 3,537,724 | 11/1970 | Matthews | 280/763.1 |
| 3,690,694 | 11/1972 | Hernden | 280/763.1 |
| 3,770,297 | 11/1973 | Quick | 296/164 |
| 3,801,128 | 4/1974 | Hernden | 280/763.1 |
| 3,823,958 | 7/1974 | Treibal | 280/763.1 |
| 3,933,372 | 1/1976 | Hernden | 280/763.1 |
| 4,199,123 | 4/1980 | Weber | 248/168 |
| 4,268,066 | 5/1981 | Davis | 280/763.1 |
| 4,441,693 | 4/1984 | Silver | 254/420 |

FOREIGN PATENT DOCUMENTS 0156743 12/1980 Japan .................................. 280/763.1

Primary Examiner—John J. Love
Assistant Examiner—Donn McGiehan
Attorney, Agent, or Firm—Frederick Gotha

[57] ABSTRACT

A stabilizer device for stabilizing fifth wheel recreational vehicles relative to a support surface where the vehicle has a connector pin extending downwardly from a strike plate mounted on the underside of the vehicle cantilever overhang at the towing end of the vehicle. A compensator having a support axis incorporates a receptacle open at at least one end and at least in part defined by a restraint surface facing toward and spaced from the support axis and adapted to receive the connector pin and thereby restrain it laterally. A pair of elongated leg members are pivotally mounted to the compensator for rotation relative thereto and are laterally spaced on either side of the support axis. In the preferred embodiment a tensioning means consisting of a ratchet and pawl interconnects the leg members at a distance from their respective pivot points for drawing the legs toward one another thereby causing the compensator to bear in compression against the strike plate and stabilize the vehicle.

18 Claims, 6 Drawing Figures

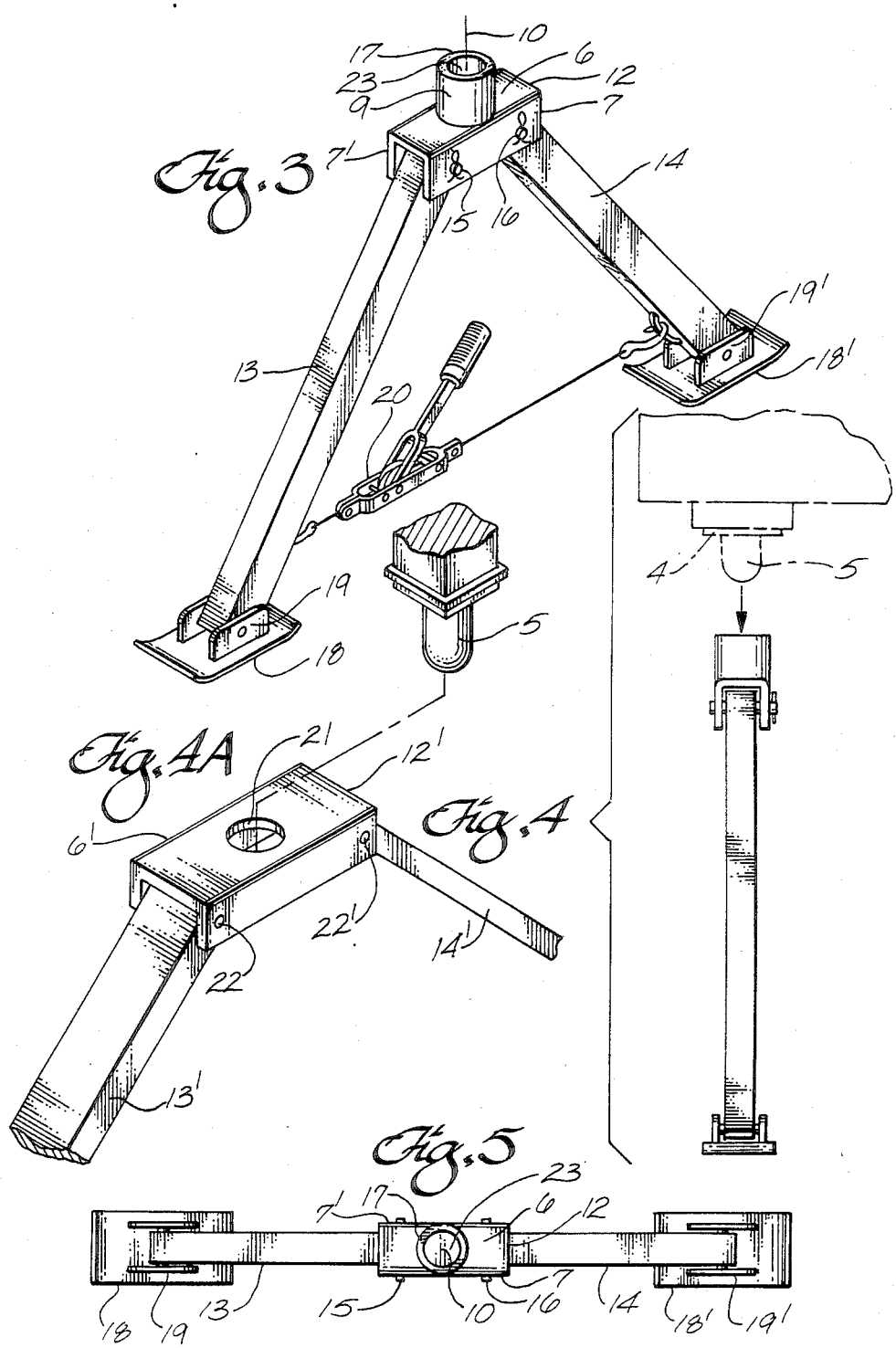

STABILIZER DEVICE

This is a continuation of co-pending application Ser. No. 846,610, filed on Mar. 31, 1986.

BACKGROUND

1. Field of the Invention

This invention is directed to a device for stabilizing fifth wheel recreational vehicles when the cab portion of the vehicle is separated from the trailer portion.

2. Description of the Prior Art

When the cab of a fifth wheel recreational vehicle is separated from the trailer, there is a cantilever overhang section at the cab end of the trailer which constitutes part of the living quarters of the trailer. The trailer is normally supported by the tires and extension rods which are lowered from the body of the trailer after separation of the cab vehicle. The cantilever overhang section, however, is subject to pitching, yawing, and rolling moments induced by wind forces acting against the trailer and by dynamic forces acting within the trailer such as an individual or individuals merely walking. Such forces will induce reactive forces which are noncoplaner, thereby producing pitching, yawing, and rolling moments in the cantilever overhang at the cab end of the vehicle. To comfortably utilize the living quarters contained in the cantilever portion various forms of stabilizer devices have been used in the prior art.

In order to use the present types of stabilizing devices for fifth wheel vehicles, it was necessary to first lift or jack-up the cantilever section by applying a force to the strike plate on the underside of the cantilever section. Thereafter a pair of stabilizing struts connected at their lower ends by a continuous chain link and unconnected at their upper ends are employed to brace the trailer. The upper end of each stabilizing strut contains a horizontal flange member rigidly attached to the strut and a verticle restraint member also rigidly attached to the strut forming an "L" shaped end for bearing against the strike plate housing extending from the underside of the cantilever section. Installation of the struts requires that the "L" shaped strut ends are positioned against the strike plate housing before the jack device is lowered. When the jack is lowered, the lower ends of the strut members which are adapted for relative sliding movement across the support surface move until the continuous chain link is in tension. The strut members are then in compression thereby forming a triangular type brace which stabilizes the cantilever overhang of the trailer vehicle. In order to remove the strut members, the cantilever section must be lifted or jacked up to relieve the compressive loading on the struts. This type of stabilizer has the inherent disadvantage of requiring the trailer to be lifted or jacked up before it can be used and also requires the use of a lift or jack device at the time of removal. A further and more limiting disadvantage is that these types of stabilizers do not work on uneven ground terrain because of the rigid "L" shaped end of the struts.

Trailer stabilizing devices having a force means to draw the strut members or stabilizing legs toward one another are known in the prior art. For example, U.S. Pat. Nos. 3,933,372, 3,690,964 and 3,801,128, demonstrate a force means interconnecting stabilizing legs which are pivotedly mounted to the underside of a trailer. As disclosed in the above identified patents, the support legs have an operative position extending downward and outward from the trailer and a raised position extending parallel to the underside of the trailer. When in the raised position, the support legs engage a bracket means which holds the leg assembly in a raised position. The force means holds the leg assembly in the bracket means when the legs are in the retracted position. This type of stabilizing device, however was designed to be permanently carried on the underside of a conventional trailer and not for use with a fifth wheel trailer vehicle.

The prior art also shows in U.S. Pat. No. 2,924,463 a trailer frame support which consists of a pair of struts used to support the forward end of a trailer frame to prevent lateral shifting thereof. A tension element extends between the projecting ends of the struts to prevent separation after the struts are loaded. The struts are separately mounted to the trailer frame and the frame is lowered by a crank which results in a tensioning of the tension element because of increased loading on the struts.

SUMMARY OF THE INVENTION

It is therefor an object of this invention to provide a fifth wheel recreational vehicle stabilizer device which eliminates the necessity of jacking-up the cantilever overhang of the trailer at the cab end of the vehicle in order to install the stabilizer.

It is also an object of this invention to provide a stabilizer device for fifth wheel recreational vehicles where the device may be readily used on uneven ground terrain.

The present invention is directed to a device for stabilizing fifth wheel recreational vehicles relative to a support surface where the vehicle has a connector pin extending downwardly from a strike plate mounted on a housing extending from the underside of the vehicle overhang at the cab end of the vehicle. The device consists of a compensator member which is a rigid body that incorporates a receptacle open at at least one end and at least in part defined by a restraint surface facing toward and spaced from the support axis of the device and adapted to receive the connector pin to restrain the pin from lateral movement. A pair of elongated leg members are pivotally mounted at their upper ends to the compensator oppositely and laterally from the support axis and a uni-directional tensioning means interconnects the leg members at a distance from their respective pivot points for drawing the leg members toward each other thereby causing the compensator to bear in compression against the strike plate.

In the preferred embodiment of the invention, the cmpensator consists of a rigid body comprising a base plate having an elongated neck member extending axially from the base plate and terminating in an end surface which is adapted for bearing against the strike plate. The neck member has an opening in its end surface to receive the connector pin and an axially extending bore to restrain the connector pin from lateral movement.

An alternative embodiment of the invention consists of the compensator having a rigid body which is defined by a rectangular plate member having a plane upper surface which is adapted for bearing at least in part against the strike plate and where there is an aperture in the plate member which constitutes the receptacle for the connector pin. Lateral motion of the connector pin is restrained by the aperture wall.

In both of the above embodiments of the invention, the elongated leg members are drawn together after the connector pin is inserted into the receptacle by a ratchet and pawl type device which interconnects the leg members below the pivot points on the compensator member.

Thus, a stabilizer device for fifth wheel recreational vehicles is provided which overcomes the limitations of the prior art. The receptacle in the compensator member receives the connector pin extending from the strike plate and at least a portion of the upper surface of the compensator bears in compression against the strike plate of the trailer when the elongated leg members of the stabilizer device are drawn together by the tensioning means. The stabilizer device requires no jacks or lifting devices to be first used to elevate the cantilever overhang before positioning the stabilizer device under the overhang. With the upper ends of the elongated leg members pivotly connected to the compensator and located lateral from and opposite from the support axis, the bearing surfaces of the strike plate and compensator member will remain in flush contact with each other as the elongated members are drawn together.

Other details and particulars of the invention will follow from the description below and by reference to the attached drawings.

BRIEF DESCRIPTION OF THE DRAWINGS

FIG. 3 is a perspective view of the preferred embodiment of the invention.

FIG. 4 is a side view of the preferred embodiment of the invention.

FIG. 4a is a partial perspective view of another embodiment of the invention.

FIG. 5 is a top view of the preferred embodiment of the invention.

DETAILED DESCRIPTION

Figure 1:
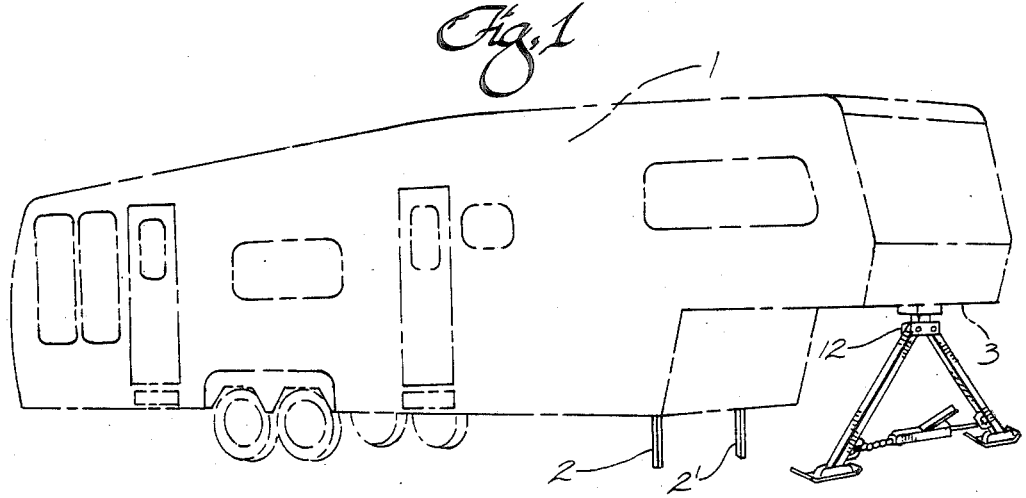
FIG. 1 is a perspective view of a fifth wheel recreational vehicle and the stabilizer device of the invention in its engagement position with the cantilever overhang section of the vehicle.

Referring now to the drawings, FIG. 1 represents a fifth wheel recreational vehicle 1 with the cab towing vehicle (not shown) removed from the cantilever overhang section 3 of the vehicle. Rods 2 and 2' are extension rods which are lowered from vehicle 1 after the cab towing vehicle is removed. These rods in combination with the tires of the recreational vehicle support its weight.

Figure 2:
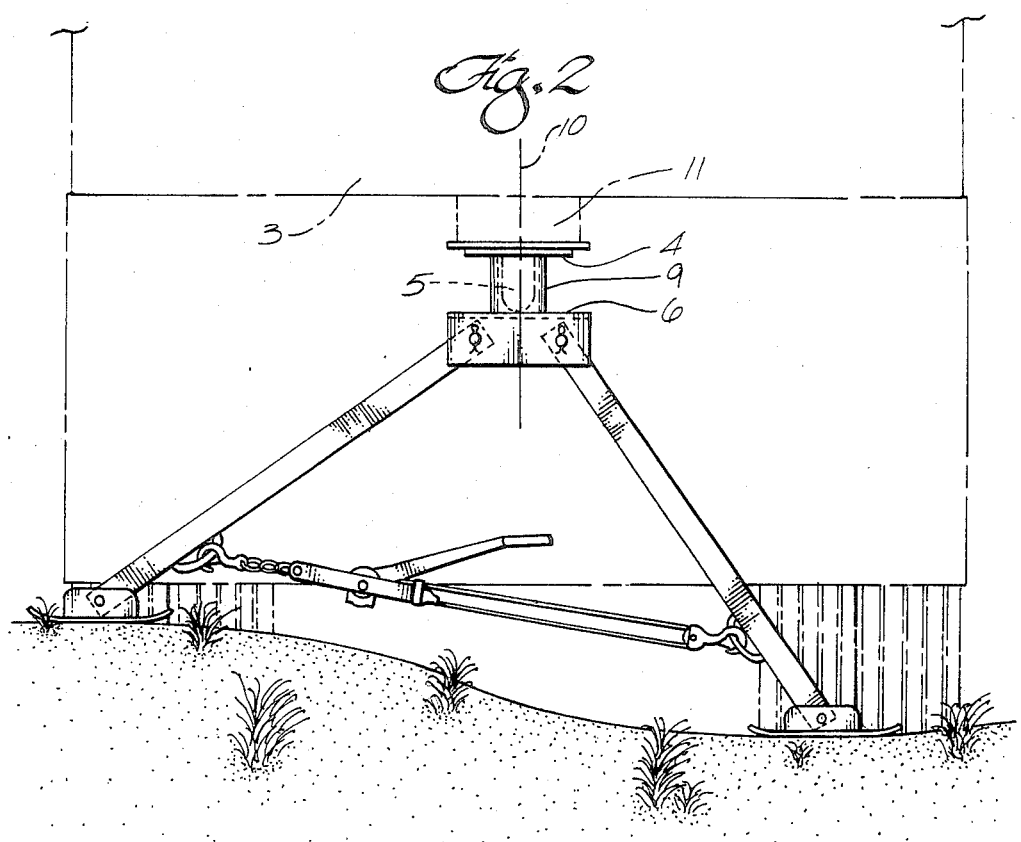
FIG. 2 illustrates a frontal view of the preferred embodiment of the invention on uneven ground terrain.

As more particularly shown in FIG. 2, the cantilever overhang section 3 has a strike plate 4 and connector pin housing 11 extending from the underside of the cantilever overhang portion 3 of the trailer 1. The strike plate 4 is rigidly attached to housing 11. Extending from the strike plate is connector pin 5 which inserts into a receptacle located in the cab towing vehicle when the fifth wheel recreational vehicle is to be towed. When vehicle 1 is to be used for living quarters, the connector pin 5 is utilized in combination with the stabilizer device in the stabilization of the vehicle.

The preferred embodiment of the invention is shown in FIG. 3. As can be seen in FIG. 3, a compensator member 12 has a support axis 10 and an axially extending elongated neck member 9. Elongated neck member 9 is rigidly attached to the base member 6 which has a pair of flange members 7 and 7' extending downwardly and oppositely from said neck section 9 to form along with neck section 9 the physical structure of compensator 12. Elongated leg members 13 and 14 are pivotally connected to flanges 7 and 7' by pins 15 and 16 to permit rotation of the leg members relative to the compensator. As can further be seen in FIG. 3, pins 15 and 16 are located laterally and spaced oppositely from support axis 10. The forces therefore, which are transmitted by elongated legs 13 and 14 to the compensator 12 create opposing moments about support axis 10 which cause the end surface 17 of neck member 9 to fit flushly against the strike plate 4 when elongated legs 13 and 14 are in compression. Although not shown, the elongated legs may be of a telescopic design to permit uneven extension of the legs to accommodate ground terrain.

As further depicted in FIG. 3, a first shoe member 18 is pivotally connected to elongated leg member 13 by a pivot pin 19. With shoe member 18 pivotally connected to said leg member 13, movement of leg member 13 is more readily accmmodated across a support surface such as ground terrain when leg members 13 and 14 are drawn toward one another. This is accomplished by tensioning device 20 which is represented in FIG. 3 as a pawl and ratchet device connected to the leg members at points which are below the pivots 15 and 16. To further accmmodate movement of the leg members, shoe member 18' is pivotally attached by pivot pin 19' to elongated leg 14 to facilitate movement of leg 14 when the leg members are drawn together by tensioning means 20. Although shoe members 18 and 18' accommodate movement of the leg members, the leg members may nevertheless be drawn toward each other without the presence of shoe members which constitutes another form of structure for the stabilizer device.

Another embodiment of the invention is shown in FIG. 4a. A compensator 12' consists of a rectangular plate member 6' which has a plane upper surface with an aperture 21 where the aperture has a diameter which is of sufficient dimension to receive the connector pin 5 so as to restrain the connector pin from lateral movement. In this embodiment of the invention the rectangular plate member bears in compression against the strike plate 4 when elongated leg members 13' and 14' are drawn toward one another by the tensioning means 20.

In operation, the stabiling device is positioned below the connector pin 5 as shown in FIG. 4 and elongated leg members 13 and 14 drawn sufficiently toward each other to permit the insertion of connector pin 5 into the longitudinal bore or void 23 contained within elongated neck member 9. After the connector pin is inserted into longitudinal bore or void 23, the tensioning means is then utilized to draw elongated leg members 13 and 14 toward each other, which upon sufficient movement, places the upper surface 17 of the neck member in bearing against the lower face of the strike plate 4 and continued drawing of elongated legs 13 and 14 toward each other by the tensioning means 10 places the compensator 12 in compression against the strike plate 4. When the support surface or ground terrain is uneven, the connector pin is readily insertable into the stabilizer device by pivoting either or both of the elongated leg members about pivots 15 and 16 and then drawing the leg members toward each other until the connector pin 5 is restrained from lateral movement within the longitudinal bore or void 23 of elongated neck member 9. Thereafter the tensioning means 20 is utilized to draw the elongated legs toward one another. The forces acting on compensator 12 which are transmitted through the elongated leg members will produce opposing moments about support axis 10 thereby causing the upper surface 17 of the compensator to remain in flush bearing against the strike plate 4. This causes the cantilever overhang section 3 to be lifted and prevents displacement of the cantilever overhang section in a vertical or horizontal direction thereby eliminating any pitching or yawing movement or induced rolling produced by said pitching or yawing that would occur as a result of wind forces acting on the vehicle or reactive internal forces produced by movement of persons within the vehicle.

In another embodiment of the invention depicted in FIG. 4a, the compensator 12' will engage the connector pin 5 initially at aperture 21 thereby restraining the pin from lateral movement. Such engagement of the connector pin requires no jacking-up or lifting of the cantilever overhang section of the fifth wheel recreational vehicle but is accomplished by moving legs 13' and 14' away from each other and then positioning the compensator 12' to engage the pin. The plane upper surface of the base plate 6' will bear in part flushly against the strike plate 4 when legs 13' and 14' are drawn together by the force means 20. Pivot pins 22 and 22' are spaced laterally and oppositely from the support axis and therefore as legs 13' and 14' are drawn together by the tensioning means, the bearing surface of 6' and the strike plate will flushly bear against each other. The compensator, therefore, will continue to bear flushly against the strike plate as the cantilever overhang is lifted thereby preventing horizonal or vertical displacment of the cantilever overhang and stabilizing the vehicle.

The tensioning means 10 referred to above and shown in the drawings is a ratchet and pawl type device which permits incremental increases of force to draw the elongated legs toward one another. This can be accomplished by other types of tensioning means which are not shown in the drawings but could consist of a threaded bar and threaded supports engaging the bar where the supports are rigidly located on each of the elongated legs respectively at a point below the compensator pivot pins. Rotation of the threaded bar would draw the elongated legs toward each other by incrementally increasing the tension in the threaded bar. The tensioning means might also consist of a threaded turnbuckle device interconnecting the elongated legs which upon rotation of the turnbuckle would be drawn toward one another.

It is understood that all terms used herein are descriptive rather limiting. While the invention has been described in conjunction with specific embodiments, it is evident that many alternatives, modifications and variations will be apparent to those skilled in the art in light of disclosure herein. Accordingly, it is intended to include all such alternatives, modifications, and variations involved in the spirit and scope of the impending claims.

I claim:

1. A stabilizer device for stabilizing fifth wheel recreational vehicles relative to a support surface where the vehicle has a connecting pin extending downardly from a strike plate mounted on the underside of the vehicle overhang said stabilizer device comprising:
   (a) a compensator having a support axis comprising a rigid body incorporating a receptacle open at at least one end and at least in part defined by a bearing surface where said bearing surface lies in a plane intersecting said axis for flush engagement with said strike plate and adapted to receive said connective pin;
   (b) a pair of elongated leg members pivotally mounted at their upper-ends to said compensator for rotation relative thereto where the pivots of said leg members are laterally and oppositely spaced from said support axis and adapted to permit movement of the compensator in a transverse direction such that said compensator may move into co-axial alignment with said connector pin thereby permitting flush engagement of said bearing surface with said strike plate under any terrain conditions; and,
   (c) uni-directional tensioning means interconnecting said leg members at a distance from their respective pivots for drawing said legs toward one another thereby causing said bearing surface to bear in compression against the strike plate.

2. The stabilizer device recited in claim 1 further comprising a first shoe member for bearing upon the support surface pivotally mounted to the lower end of an elongated leg member where said first shoe member is so constructed and adapted to permit it to move relative to the support surface while in bearing contact therewith upon rotational movement of said leg member.

3. Stabilizer device recited in claim 2 further comprising a second shoe member for bearing upon the support surface pivotally mounted to the lower end of the other said leg member where said second shoe member is so constructed and adapted to permit it to move relative to the support surface while in bearing contact therewith upon rotational movememt of said other leg member.

4. The stabilizer device recited in claim 1 where the rigid body of said compensator comprises a base member, an elongated neck member extending axially from said base member where said neck member terminates in an end surface adapted to bear against said strike plate and, where said receptacle is further defined by a longitudinal void in said neck member communicating with an opening in said end surface.

5. The stabilizer device recited in claim 4 further comprising a first shoe member for bearing upon the support surface pivotally mounted to the lower end of an elongated leg member where said first shoe member is so constructed and adapted to permit it to move relative to the support surface while in bearing contact therewith upon rotational movement of said leg member.

6. The stabilizer device recited in claim 5 further comprising a second shoe member for bearing upon the support surface pivotally mounted to the lower end of the other said leg member where said second shoe member is so constructed and adapted to permit it to move relative to the support surface while in bearing contact therewith upon rotational movement of said other leg member.

7. The stabilizer device recited in claim 1 where the rigid body of said compensator comprises a rectangular plate member having a plane upper surface adapted for bearing at least in part against said strike plate where said receptacle is further defined by an aperture in said plate member.

8. The stabilizer device recited in claim 7 further comprising a first shoe member for bearing upon the support surface pivotally mounted to the lower end of an elongated leg member where said first shoe member is so constructed and adapted to permit it to move relative to the support surface while in bearing contact therewith upon rotational movement of said leg member.

9. The stabilizer device recited in claim 8 further comprising a second shoe member for bearing upon the support surface pivotally mounted to the lower end of the other said leg member where said second shoe member is so constructed and adapted to permit it to move relative to the support surface while in bearing contact therewith upon rotational movement of said other leg member.

10. In combination with a fifth wheel recreational vehicle having a connecting pin extending downward from the strike plate mounted on the underside of the vehicle overhang, a stabilizer device comprising:
    (a) a compensator having a support axis comprising a rigid body incorporating a receptacle open at at least one end and at least in part defined by a bearing surface where said bearing surface lies in a plane intersecting said axis for flush engagement with said strike plate and adapted to receive said connector pin;
    (b) a pair of elongated leg members pivotally mounted to said compensator for rotation relative thereto, where the pivots of said leg members are laterally and oppositely spaced from said axis and adapted to permit movement of the compensator in a transverse direction such that said compensator may move into co-axial alignment with said connector pin thereby permitting flush engagement of said bearing surface with said strike plate under any terrain conditions; and,
    (c) uni-directional tensioning means interconnecting said leg members at a distance from their respective pivots for drawing said legs toward one another thereby causing said bearing surface to bear in compression against the strike plate.

11. The combination recited in claim 10 further comprising a first shoe member for bearing upon the support surface pivotally mounted to the lower end of an elongated leg member where said first shoe member is so constructed and adapted to permit it to move relative to the support surface while in bearing contact therewith upon rotational movement of said leg member.

12. The combination recited in claim 11 further comprising a second shoe member for bearing upon the support surface pivotally mounted to the lower end of the other said leg member where said second shoe member is so constructed and adapted to permit it to move relative to the support surface while in bearing contact therewith upon rotational movement of said other leg member.

13. The combination recited in claim 10 where the rigid body of said compensator comprises a base member, an elongated neck member extending axially from said base member where said neck member terminates in an end surface adapted to bear against said strike plate, and where said receptacle is further defined by a longitudinal void in said neck member communicating with an opening in said end surface.

14. The combination recited in claim 13 further comprising a first shoe member for bearing upon the support surface pivotally mounted to the lower end of an elongated leg member where said first shoe member is so constructed and adapted to permit it to move relative to the support surface while in bearing contact therewith upon rotational movement of said elongated leg member.

15. The combination recited in claim 14 futher comprising a second shoe member for bearing upon the support surface pivotally mounted to the lower end of the other said leg member where said second shoe member is so constructed and adapted to permit it to move relative to the support surface while in bearing contact therewith upon rotational movement of said other leg member.

16. The combination recited in claim 10 where the rigid body of said compensator comprises a rectangular plate having a plane upper surface adapted for bearing at least in part against said strike plate where said receptacle is further defined by an aperture in said plate member.

17. The combination recited in claim 16 further comprising a first shoe member for bearing upon the support surface pivotally mounted to the lower end of an elongated leg member where said first shoe member is so constructed and adapted to permit it to move relative to the support surface while in bearing contact therewith upon rotational movement of said elongated leg member.

18. The combination recited in claim 17 further comprising a second shoe member for bearing upon the support surface pivotally mounted to the lower end of the other said leg member where said second shoe member is so constructed and adapted to permit it to move relative to the support surface while in bearing contact therewith upon rotational movement of said other leg member.

* * * * *